United States Patent
Tonies

[15] 3,659,261
[45] Apr. 25, 1972

[54] METHOD AND APPARATUS FOR IDENTIFYING ENGINES IN A TRAIN OF RAILWAY VEHICLES

[72] Inventor: Lawrence A. Tonies, Grayslake, Ill.
[73] Assignee: Mangood Corporation, Grayslake, Ill.
[22] Filed: Feb. 27, 1970
[21] Appl. No.: 15,140

[52] U.S. Cl. ..................................340/23, 246/77, 177/34
[51] Int. Cl. ..........................................................G06f 7/02
[58] Field of Search ............177/134, 163, 210, 211, DIG. 8; 340/23, 31, 38; 246/169 R, 169 D, 77, 122, 247

[56] References Cited

UNITED STATES PATENTS

| 3,374,844 | 3/1968 | Rogers | 177/134 |
| 3,079,497 | 2/1963 | Remz et al. | 246/169 D |
| 2,543,806 | 3/1951 | Roeser | 265/27 |
| 2,806,685 | 9/1957 | Vande Sande et al. | 177/10 |

FOREIGN PATENTS OR APPLICATIONS

| 1,089,238 | 9/1954 | France | 177/DIG. 8 |

Primary Examiner—Kathleen H. Claffy
Assistant Examiner—Thomas L. Kundert
Attorney—Davis, Lucas, Brewer & Brugman

[57] ABSTRACT

A system for identifying engines in a mixed train of standard four-, six-, and eight-axle railway cars and engines while coupled and in motion. First, second, third, and fourth axle detectors are arranged along the line of movement of the train. The first and fourth axle detectors are spaced from 9 feet 4 inches to 11 feet apart, with adjacent ones being less than 4 feet 6 inches apart, for railway vehicles having axles spaced according to current, standard American railway practice. For other axle spacings, the detector spacings may differ. There is a counter for each of the first, third, and fourth detectors with axle determination logic enabling each to start with a one count when actuated by the first axle of each car or engine and to count up to the total number of axles per vehicle and reset to zero. Two overriding and overlapping logics are provided to identify engines, one being effective on all four-axle engines and some six- and eight-axle engines, the other being effective on all six- and eight-axle engines not identified by the first. An engine identifying signal is activated when an engine is detected.

14 Claims, 2 Drawing Figures

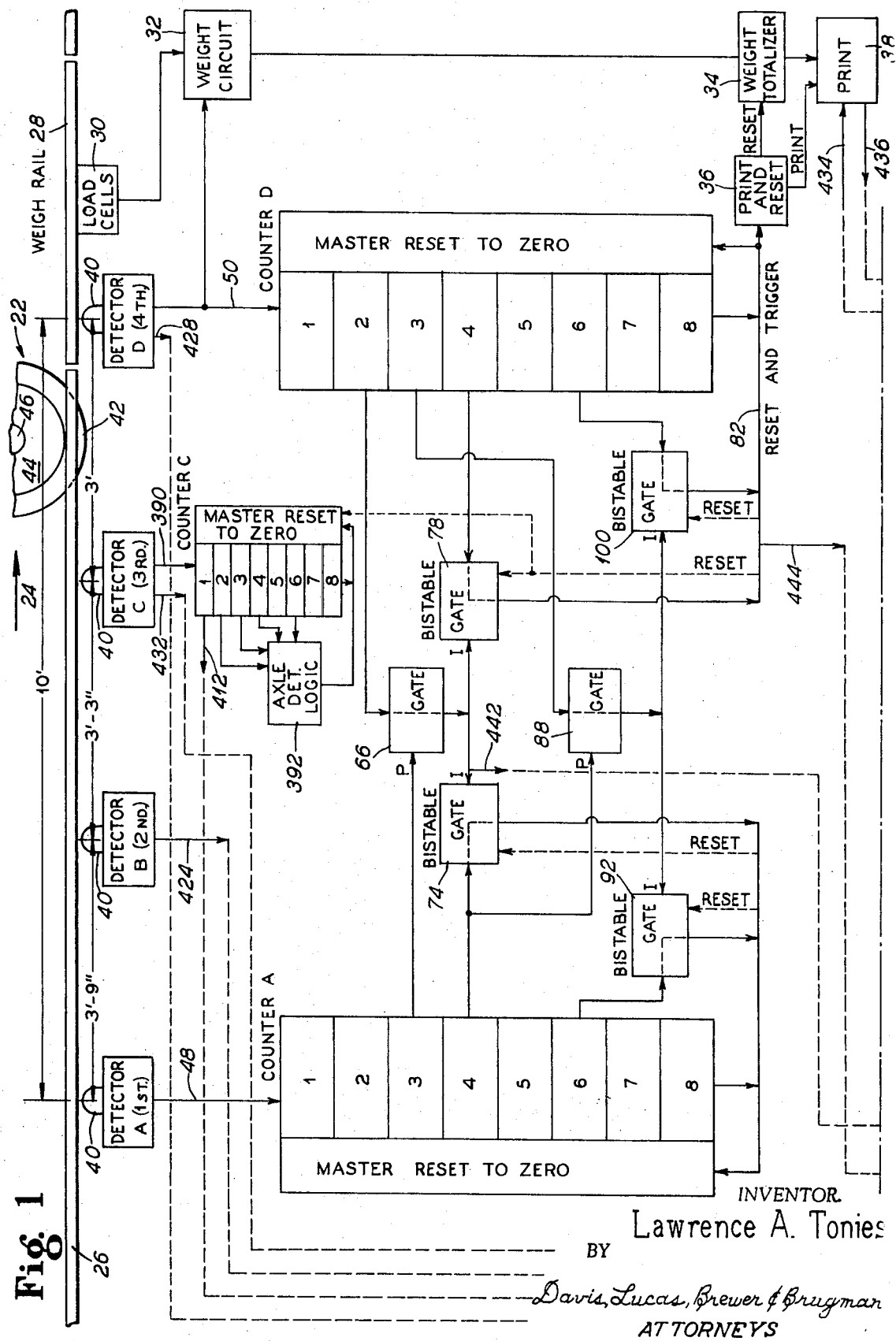

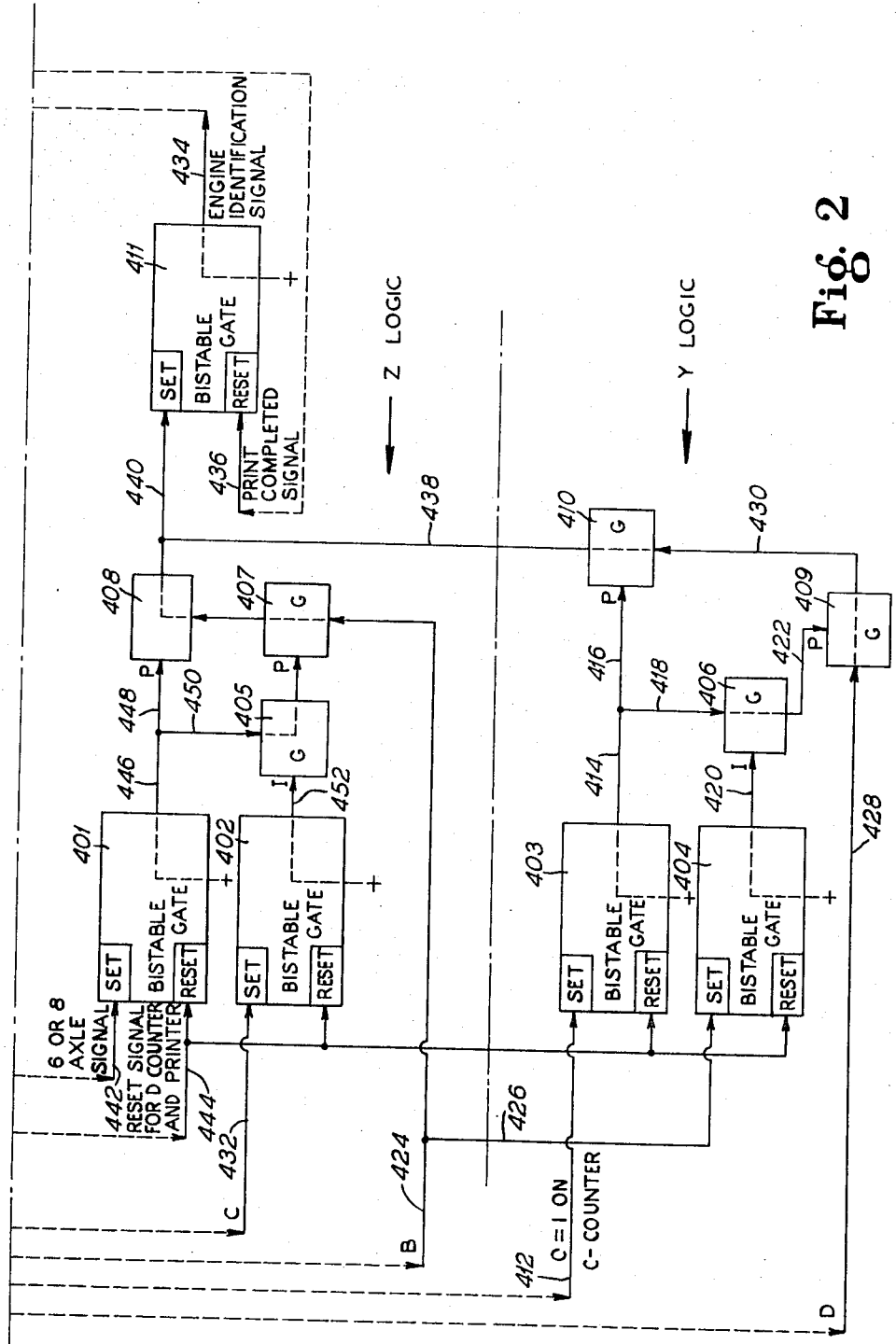

METHOD AND APPARATUS FOR IDENTIFYING ENGINES IN A TRAIN OF RAILWAY VEHICLES

CROSS-REFERENCES TO RELATED APPLICATIONS

Reference is made to the following related patent applications, assigned to the same assignee, filed concurrently with this application:

Tonies application Ser. No. 15,066, filed Feb. 27, 1970, on "METHOD AND APPARATUS FOR GENERATING A READ-OUT SIGNAL SYNCHRONIZED WITH RAILWAY VEHICLE MOVEMENT";

Tonies and Teasdale application Ser. No. 15,067, filed Feb. 27, 1970, on "METHOD AND APPARATUS UTILIZING UNIQUE CDAB SEQUENCE FOR DETECTING SYNCHRONIZATION ERROR IN RAILWAY VEHICLE READ-OUT SIGNAL";

Tonies and Teasdale application Ser. No. 15,068, filed Feb. 27, 1970, on "METHOD AND APPARATUS UTILIZING UNIQUE CDAB SEQUENCE FOR CORRECTING SYNCHRONIZATION ERROR IN RAILWAY VEHICLE READ-OUT SIGNAL";

Tonies application Ser. No. 15,141, filed Feb. 27, 1970, and now U.S. Pat. No. 3,605,081, on "SEQUENCE DETECTOR FOR RAILWAY VEHICLE CONTROL SYSTEM"

Bailey application Ser. No. 15,142, filed Feb. 27, 1970, on "CIRCUIT FOR SIGNALING ALTERNATION ERROR IN DETECTORS FOR RAILWAY VEHICLE CONTROL SYSTEM."

BACKGROUND OF THE INVENTION

The field of the invention is generally that of actuating a read-out signal which triggers the printing or display of weight, origin, destination, owner, type of load, and other information about individual railway vehicles which are coupled in motion. It is particularly applicable to the field of multi-draft, axle-by-axle motion weighing of railway vehicles in which the axle assemblies of each car weighed one by one and then totalized and printed out or displayed in response to a read-out signal which coincides with weighing the last axle of each vehicle.

In many of these systems it is desirable to identify locomotives so they may be disregarded or specially identified on the information which is printed out or displayed about the train.

This problem is complicated by the fact that engines, as well as cars, come in many variations and sizes including four-, six-, and eight-axle variations.

SUMMARY OF THE INVENTION

A principal object of the present invention is to provide a method which may be practiced manually, or by a semi- or fully-automatic system for identifying engines or locomotives in a train of standard railway vehicles which may comprise a mixture of one or more of four-, six-, and eight-axle cars and engines.

Another object is to count axle movements as a train moves past four specific locations along the line of movement of a train and identify sequences of axle movements past those locations which are unique to railway engines and not to cars.

A specific object is to provide first, second, third, and fourth axle detectors along the line of movement of a train, and provide counters which are synchronized with axle movements past the first, third, and fourth detectors, and two control logics one of which identifies four-axle engines and some six- and eight-axle engines, and the other of which identifies six- and eight-axle engines which may have been missed by the first logic.

Other objects and advantages will be apparent from the following description taken in connection with he drawings in which:

FIG. 1 is a schematic representation of an axle determination logic, axle detectors, and axle counters illustrating one preferred way of practicing the present invention; and FIG. 2 is a continuation of FIG. 1 showing the logics which I have developed to identify engines.

Like parts are referred to by like reference characters in the drawings.

Much of FIG. 1 is a repeat of the axle determination logic disclosed in my application Ser. No. 15,066, filed Feb. 27, 1970, on "METHOD AND APPARATUS FOR GENERATING A READ-OUT SIGNAL SYNCHRONIZED WITH RAILWAY VEHICLE MOVEMENT" and will not be repeated here except as it is desirable to provide an environment and understanding for the present invention.

A railway vehicle axle assembly 22 is carried by a car or engine (not shown) and is movable along a line of train movement indicated by the arrow 24. Railway tracks 26 include a small weigh rail section 28 which may be between 4 feet and 4½ feet long, although it may be of any length depending on the exact method of weighing employed.

Where, as illustrated here, a read-out signal is synchronized with movement of one or more of the axle assemblies and is used to trigger the printing or display of many kinds of information about a railway vehicle, a typical system shown in the above-identified related pending applications will be described to facilitate an understanding of the invention.

The load of one axle assembly 22 on the weigh rails 28 is applied to load cells 30 which re interconnected with a weight circuit 32. The load cells are of known construction, providing an electrical network normally balanced under zero strain condition of the load cells. When the axle assembly load is applied to the weigh rail, the load cells produce an output voltage, the magnitude and phase direction of which are directly dependent upon the extent and direction and unbalance of the network in the load sensing function of the load cells. The voltage produced by the load cells is fed into the weight circuit 32 where it will be converted to a frequency signal proportional to the voltage. The frequency is applied to an electronic counter which counts the number of cycles or pulses for a fixed time which may be 0.1 to 1.0 seconds or possibly longer if the weigh rail will accommodate the axle assembly at the speed it is traveling which is usually less than 10 miles per hour. The weight circuit feeds a frequency count signal, showing the weight of each axle assembly on a vehicle, to the weight totalizer 34 which accumulates the weights of all the axle assemblies per vehicle and sends the total to a printer 38 on activation of the read-out signal which coincides with a reset signal in line 82. This coincides with the weighing of the last axle of each vehicle, the read-out signal being fed through line 82 to the print and reset command circuit 36. This will place a command on the weight totalizer 34 to transfer the total accumulated weight of all axles of the vehicle to the printer 38. The weight totalizer will then reset ready to start accumulating axle weights for the following vehicle.

Unless some special means is provided to disregard locomotives or identify them specially, they will be weighed and the weights will be printed out on display tape, providing a possible source of confusion for people receiving this information. Some customers want engines completely eliminated from the tape, others want them printed and identified as engines. In either case, the present invention forms a simple and reliable circuit for this purpose.

First, second, third, and fourth axle detectors A, B, C, and D are approximately evenly spaced along the line of movement of the train. More specifically, detectors A and D are spaced approximately 10 feet apart in the circuit illustrated. Detectors A and B are 3 feet 9 inches apart; B and C are 3 feet 3 inches apart; and C and D are 3 feet apart. For proper operation in accordance with this invention, detectors A and D should be not less than 9 feet 4 inches apart and not more than 11 feet apart and the adjacent detectors should should be less than 4 feet 6 inches apart.

Each axle detector may be any suitable means for detecting the arrival, presence, or passage of an axle assembly and may be responsive to magnetic, inductive, capacitive, electrical, or mechanical characteristics of an axle or wheel. In the present case, each detector is in the nature of a switch having an actuating plunger 40 which is positioned to be depressed by flange 42 of each wheel 44 carried by axle 46.

Counters A and D, bistable gates 74, 78, 92, and 100, and gates 66 and 88 and their interconnections and functions are described in detail in my above-mentioned co-pending application Ser. No. 15,066.

Briefly, they function as an axle identification logic which controls the operation of counters A and D so that they will start with a one count as the first axle of a car or engine moves past the corresponding detector A or D and remains so synchronized whether the vehicles have four, six, or eight axles and mixed any way in the train.

For the present invention, I have added a counter C, connected by line 390 to detector C for the specific purpose of enabling one of the logics to be enabled when the first axle of a vehicle actuates detector C. Axle determination logic 392, similar to that shown for counters A and D is provided to maintain counter C synchronized with the vehicle axles.

Thus, counters A, C, and D are connected by lines 48, 390, and 50 to receive pulses from axle detectors A, C, and D to record the count totals of axles moving past one or the other of the detectors along the line of movement of the train. Axle detector B, while having no counter associated with it, indicates movement of an axle assembly past it for use in one of the logic circuits which identify engines.

To facilitate consideration of the overall system as an entity FIGS. 1 and 2 have been drawn with broken lines connecting opposite ends of conductors 428, 412, 424, 432, 442, 444, 434, and 436.

Logics Y and Z are shown in FIG. 2. Logic Y identifies all four-axle engines, and some six-axle and eight-axle engines. Logic Z is complementary, identifying any six- or eight-axle engines which may not have been identified by Logic Y.

Logic circuits Y and Z utilize differences in car and engine axle spacings to distinguish one from the other by the sequence in which they actuate the four precisely arranged axle detectors. Engines can then be weighed or not weighed along with cars as desired, and engines may be specially identified on the format to distinguish them from cars.

Logic Y will first be described. It is enabled when the first axle of a vehicle actuates detector C, that is when the 1-count totalizer of counter C is activated. After enabling, if detector D is actuated before detector B, an engine signal will be activated. Conversely, if, after enabling, detector B is actuated before detector D, no engine signal will result. This will now be described with respect to the details in FIG. 2.

Logic Y comprises two bistable gates 403, 404 and three control gates 406, 409, and 410 interconnected as shown.

A word of explanation about gate nomenclature: the word "INHIBIT" or letter "I" on a gate control line means a signal on that control line *inhibits* or blocks a signal through the gate. The word "PERMIT" or the letter "P" means a signal on the control line *permits* a signal to pass through the gate. Specifically, a signal on line 420 inhibits a signal from line 418 to 422 through gate 406.

Logic Y is enabled by the 1-count totalizer of counter C which puts an enabling signal in line 412. This sets (that is, turns on) the bistable gate 403 placing a signal on output line 414 and branch lines 416, 418. This renders gate 410 permissive. The signal on 418 passes through gate 406 (which has no inhibit signal on control line 420) into line 422 where it renders gate 409 permissive.

At this stage, actuation of detector D would place a signal in line 428 which would be free to pass through both gates 409 and 410 into lines 438 and 440 to set (that is, turn on) bistable gate 411 controlling an engine identification signal into line 434. This would feed into the printer 38 identifying the vehicle as an engine.

On the other hand, if, following enabling of Logic Y, the detector B is actuated before detector D this will place a signal in line 424 which will set bistable gate 404 and put an inhibit signal on gate 406 through line 420. This blocks the signal coming from line 418 and restores gate 409 to its normal inhibit state. This will block a subsequent signal from counter D at gate 409.

The operation of Logic Y therefore may be expressed by two formulas as follows:

C = 1 ... B before D — Dis-enable
C = 1 ... D before B — Engine Signal

Logic Z will now be described. This comprises two bistable gates 401, 402 and three control gates 405, 407, and 408.

Logic Z is enabled in response to a signal in line 442 that the vehicle has six or eight axles and not four. This is described in detail in the co-pending application referred to above and will not be repeated here except to note that the signal in 442 occurs when the 2-count totalizer of counter D is activated while the 3-count totalizer of counter A is activated. Another way of saying this is that the system verifies a six- or eight-axle vehicle when the second axle of a vehicle reaches detector D after the third axle of the vehicle but not the fourth has passed detector A.

The signal in line 442 sets bistable gate 401, thereby enabling Logic Z. This activates output line 446 and branch lines 448, 450 rendering gate 408 permissive. The signal passes through gate 405 and renders gate 407 permissive.

If, at this time, with both gates 407, 408 rendered permissive, detector B is actuated, a signal on line 424 will pass through both gates 407, 408 and set bistable gate 411 placing an engine identification signal in line 434 leading to printer 38 as described above.

Conversely, if, after Logic Z is enabled, detector C is actuated before detector B, a signal will be placed in line 432 which will set bistable gate 402, placing an inhibit signal through output line 452 on gate 405. This blocks the signal from line 450, restoring gate 407 to its normal inhibiting state. If, therefore, after enabling of Logic Z, detector C is actuated before detector B, no engine signal will be generated. An engine signal will be generated if the second detector is actuated before the third detector, but not if the third detector is actuated before the second detector.

This may be expressed by the formulas as follows:

D=2, A=3 ... C before B — Dis-enable
D=2, A=3 ... B before C — Engine Signal.

While it is contemplated that most of the components will be solid state elements, it should be emphasized that a wide range of electrical and electronic components may be used.

As stated, the initial and final axle detectors A and D should be spaced between 9 feet 4 inches and 11 feet apart to function with the standard axle spacings employed in standard American railway vehicles. Other spacings may be used where railway vehicle axle spacings differ from those in current, standard American railway practice. Broadly, to function in accordance with the present invention, detectors A and D are spaced apart less than the minimum distance between inner axles on trucks at opposite ends of a standard railway vehicle (eleven feet in certain ore cars, for example), and more than the maximum distance between adjacent axles on any one truck of a standard railway vehicle (9 feet 4 inches in certain engines).

I claim as my invention:

1. A method for identifying engines in a train of standard railway vehicles while coupled and in motion comprising the steps of:

detecting axle movements past first, second, third, and fourth locations spaced in the direction of movement of the train; and activating an engine identification signal in response to each of the following sequences of movements of axles past said locations a. movement of a first axle of a vehicle past said third location followed by movement of an axle past said fourth location before an axle moves past said second location, and b. movement of a second axle past said fourth location when a third but not a fourth axle has passed said first location followed by movement of an axle past said second location before an axle moves past said third location.

2. A method for identifying engines in a train of standard railway vehicles while coupled and in motion in accordance with claim 1 in which said first and fourth locations are spaced not less than 9 feet 4 inches and not more than 11 feet apart.

3. A method for identifying engines according to claim 1 in which said locations are spaced approximately as follows:
first to second location — 3 ft. 9 in.
second to third location — 3 ft. 3 in.
third to fourth location — 3 ft. 0 in.

4. A method for identifying engines in a train of standard railway vehicles while coupled and in motion comprising the steps of:
detecting axle movements past first, second, third, and fourth locations spaced in the direction of movement of the train, said first and fourth locations being spaced apart less than the minimum distance between inner axles on trucks at opposite ends of a standard railway vehicle, and more than the maximum distance between adjacent axles on any one truck of a standard railway vehicle; and
activating an engine identification signal in response to one of the following sequences of movements of axles past said locations
 a. movement of a first axle of a vehicle past said third location followed by movement of an axle past said fourth location before an axle moves past said second location, and
 b. movement of a second axle past said fourth location when a third but not a fourth axle has passed said first location followed by movement of an axle past said second location before an axle moves past said third location.

5. Apparatus for identifying engines in a train of standard railway vehicles while coupled and in motion comprising:
first, second, third, and fourth axle detectors arranged in that order along the line of movement of the train, each detector being actuatable by movement of an axle past it, and adjacent detectors being spaced less than 4 feet 6 inches apart;
engine signal means for identifying an engine;
control circuit means effective to activate the engine signal means in response to the following actuation sequences of said detectors
 a. actuation of the third detector by the first axle of a vehicle followed by actuation of the fourth detector before actuation of the second detector, and
 b. actuation of the fourth detector by the second axle of a vehicle when the first detector has been actuated by the third but not the fourth axle of the vehicle followed by actuation of the second detector before actuation of the third detector.

6. Apparatus according to claim 5 in which the first and fourth axle detectors are spaced apart less than the minimum distance between inner axles on trucks at opposite ends of a standard railway vehicle, and more than the maximum distance between adjacent axles on any one truck of a standard railway vehicle.

7. Apparatus according to claim 5 in which the first and fourth axle detectors are spaced apart not less than 9 feet 4 inches and not more than 11 feet.

8. Apparatus for identifying engines according to claim 5 in which said detectors are spaced substantially as follows:
first to second detector — 3 ft. 9 in.
second to third detector — 3 ft. 3 in.
third to fourth detector — 3 ft. 0 in.

9. Apparatus for identifying engines in a train of standard railway vehicles while coupled and in motion comprising:
first, second, third, and fourth axle detectors arranged in that order along the line of movement of the train, each detector being actuatable by movement of an axle past it, the first and fourth detectors being spaced not less than 9 feet 4 inches and not more than 11 feet apart, and adjacent detectors being spaced less than 4 feet 6 inches apart;
engine signal means for identifying an engine;
control circuit means effective to activate the engine signal means in response to the following actuation sequence of said detectors
actuation of the third detector by the first axle of a vehicle followed by actuation of the fourth detector before actuation of the second detector.

10. Apparatus for identifying engines according to claim 9 including means for inhibiting activation of the engine signal means in response to the following actuation sequence of said detectors
actuation of the third detector by the first axle of a vehicle followed by actuation of the second detector before actuation of the fourth detector.

11. Apparatus for identifying engines in a train of standard railway vehicles while coupled and in motion comprising:
first, second, third, and fourth axle detectors arranged in that order along the line of movement of the train, each detector being actuatable by movement of an axle past it, the first and forth detectors being spaced not less than 9 feet 4 inches and not more than 11 feet apart, and adjacent detectors being spaced less than 4 feet 6 inches apart;
engine signal means for identifying an engine;
control circuit means effective to activate the engine signal means in response to the following actuation sequence of said detectors
actuation of the fourth detector by the second axle of a vehicle when the first detector has been actuated by the third but not the fourth axle of the vehicle followed by actuation of the second detector before actuation of the third detector.

12. Apparatus for identifying engines according to claim 11 including means for inhibiting activation of the engine signal means in response to the following actuation sequence of said detectors
actuation of the fourth detector by the second axle of a vehicle when the first detector has been actuated by the third but not the fourth axle of a vehicle followed by actuation of the third detector before actuation of the second detector.

13. Apparatus for identifying engines in a train of standard railway vehicles while coupled and in motion comprising:
first, second, third, and fourth axle detectors arranged in that order along the line of movement of the train, each detector being actuatable by movement of an axle past it, the first and fourth detectors being spaced not less than 9 feet 4 inches and not more than 11 feet apart, and adjacent detectors being spaced less than 4 feet 6 inches apart;
engine signal means for identifying an engine;
a first control circuit including means effective to enable itself and to activate the engine signal means to identify four-axle and some six- and eight-axle engines in response to the following actuation sequence
actuation of the third detector by the first axle of an engine followed by actuation of the fourth detector before actuation of the second detector,
and means to enable and dis-enable itself without activating the engine signal means in response to the following actuation sequence
actuation of the third detector by the first axle of a car followed by actuation of the second detector before actuation of the fourth detector;
a second control circuit including means effective to enable itself and to activate the engine signal means to identify six- and eight-axle engines in response to the following actuation sequence
actuation of the fourth detector by the second axle of an engine when the first detector has been actuated by the third but not by the fourth axle of the engine followed by actuation of the second detector before actuation of the third detector,
and means to enable and dis-enable itself without activating the engine signal means in response to the following actuation sequence actuation of the fourth detector by the second axle of a car when the first detector has been actuated by the third but not by the fourth axle of the car followed by actuation of the third detector before actuation of the second detector.

14. Apparatus for identifying engines in a mixed train of railway vehicles including standard four-, six-, and eight-axle railway cars and engines while coupled and in motion comprising:

first, second, third, and fourth axle detectors arranged in that order along the line of movement of the train, each detector being actuatable by movement of an axle past it;

a counter for each of the first, third, and fourth detectors effective to count and totalize the number of axles passing each corresponding detector, and means for programming each of the counters to reset after each has counted the total number of axles on a vehicle;

the first and fourth detectors being spaced more than 9 feet 4 inches and less than 11 feet apart and the adjacent detectors being spaced less than 4 feet 6 inches apart along the line of movement of the train;

engine signal means for identifying an engine;

a first control circuit and means for enabling it in response to a "one" count on the third detector counter;

a second control circuit and means for enabling it in response to a "two" count on the fourth detector counter when there is a "three" count on the first detector counter;

said first control circuit including means to activate said engine signal means in response to the following detector and counter actuation sequence, after enabling actuation of the fourth detector and its corresponding counter before actuation of the second detector and its corresponding counter, said first control circuit including means to dis-enable it in response to the following detector and counter actuation sequence, after enabling actuation of the second detector and its corresponding counter before actuation of the fourth detector and its corresponding counter, said second control circuit including means to activate said engine signal means in response to the following detector and counter actuation sequence, after enabling corresponding actuation of the second detector and its counter before actuation of the third detector and its corresponding counter, said second control circuit including means to dis-enable it in response to the following detector and counter sequence, after enabling actuation of the third detector and its corresponding counter before actuation of the second detector and its corresponding counter.

* * * * *

PO-1050
(5/69)

UNITED STATES PATENT OFFICE
CERTIFICATE OF CORRECTION

Patent No. __3,659,261__                    Dated __April 25, 1972__

Inventor(s) __Lawrence A. Tonies__

It is certified that error appears in the above-identified patent and that said Letters Patent are hereby corrected as shown below:

Col. 1, line 38, after "car" and before "weighed" insert --are--;
       line 69, change "he" to --the--.
Col. 2, line 23, change "re" to --are--.
Col. 8, line 16, delete "corresponding";
       line 18, add --corresponding-- after "its".

Signed and sealed this 19th day of September 1972.

(SEAL)
Attest:

EDWARD M. FLETCHER, JR.                ROBERT GOTTSCHALK
Attesting Officer                     Commissioner of Patents